(12) United States Patent
Chang

(10) Patent No.: US 8,077,469 B2
(45) Date of Patent: Dec. 13, 2011

(54) CHIP CARD ASSEMBLING STRUCTURE

(75) Inventor: Cheng-Lung Chang, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 233 days.

(21) Appl. No.: 12/641,455

(22) Filed: Dec. 18, 2009

(65) Prior Publication Data

US 2010/0321903 A1    Dec. 23, 2010

(30) Foreign Application Priority Data

Jun. 22, 2009   (CN) .......................... 2009 1 0303493

(51) Int. Cl.
*H05K 7/10*    (2006.01)
(52) U.S. Cl. ......... 361/737; 439/945; 439/946; 235/492
(58) Field of Classification Search .................. 361/737; 439/630, 945, 946; 257/679; 235/441, 488, 235/492
See application file for complete search history.

(56) References Cited

U.S. PATENT DOCUMENTS

| | | | |
|---|---|---|---|
| 6,524,137 B1 * | 2/2003 | Liu et al. | 439/638 |
| 6,746,280 B1 * | 6/2004 | Lu et al. | 439/630 |
| 6,814,596 B2 * | 11/2004 | Yu et al. | 439/159 |
| 7,184,274 B2 * | 2/2007 | Wu et al. | 361/752 |
| 7,189,118 B2 * | 3/2007 | Lee | 439/630 |
| 7,416,451 B2 * | 8/2008 | Tanaka et al. | 439/630 |
| 7,425,157 B1 * | 9/2008 | Hung | 439/630 |
| 7,427,026 B2 * | 9/2008 | Kojima et al. | 235/441 |
| 7,916,488 B2 * | 3/2011 | Chang | 361/737 |

* cited by examiner

*Primary Examiner* — Dameon Levi
(74) *Attorney, Agent, or Firm* — Altis Law Group, Inc.

(57) ABSTRACT

A chip card holder, for securing a chip card in an electronic device, includes a housing, an elastic member and a strip member. The housing defines a receiving chamber. The elastic member is secured in the receiving chamber and has an elastic foldable resisting section. The strip member connects with the resisting section and an end of the strip exposes from the receiving chamber. A chip card is assembled in the receiving chamber, the resisting section of the elastic member resists against the chip card, the resisting section is folded elastically by pulling the strip member and the chip card is withdrawn by the pushing of the resisting section.

13 Claims, 3 Drawing Sheets

200~# CHIP CARD ASSEMBLING STRUCTURE

BACKGROUND

1. Technical Field

The present disclosure relates to a chip card assembling structure for a portable electronic device.

2. Description of Related Art

Portable electronic devices such as mobile phones typically employ chip cards such as SIM cards, for example for storing user information. A chip card assembling structure is formed in the portable electronic device to hold the chip cards.

A chip card assembling structure has a receiving space to receive the chip card. The receiving space is usually defined at the bottom of a cavity. The cavity receives a battery therein. During assembly/disassembly of the chip card, the battery should be removed from the cavity before taking the chip card out. Therefore, it is inconvenient for an easy manipulation of the chip card.

Therefore, there is room for improvement within the art.

BRIEF DESCRIPTION OF THE DRAWING

Many aspects of the present chip card assembling structure can be better understood with reference to the following drawings. The components in the various drawings are not necessarily drawn to scale, the emphasis instead being placed upon clearly illustrating the principles of the present chip card assembling structure. Moreover, in the drawings, like reference numerals designate corresponding parts throughout the diagrams.

DETAILED DESCRIPTION OF THE EMBODIMENT

Figure 1:
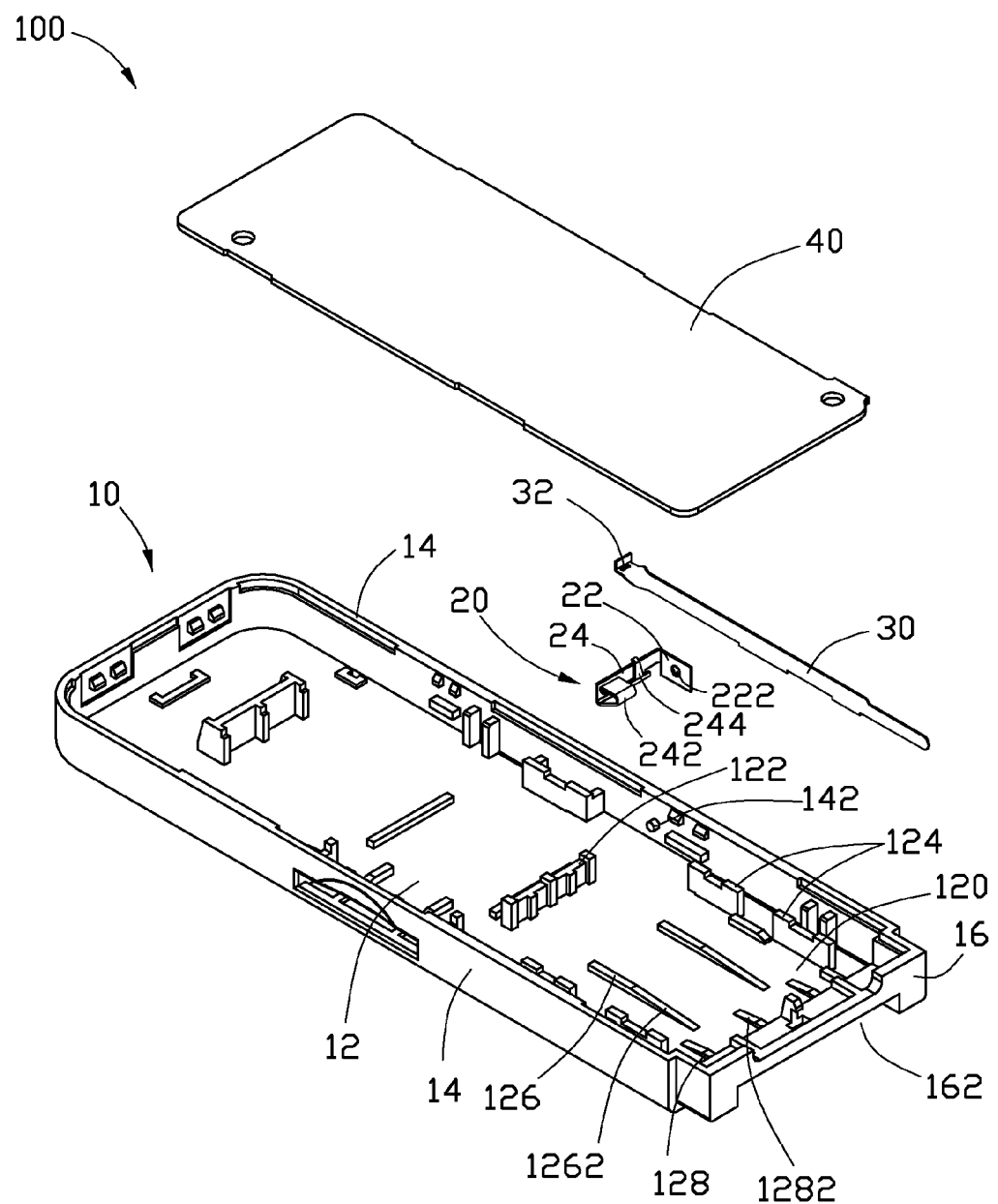
FIG. 1 is an exploded, isometric view of a chip card assembling structure according to an exemplary embodiment.

FIG. 1 shows an exemplary chip card assembling structure 100, which can be used in mobile phones and other portable electronic devices for holding a chip card. The chip card assembling structure 100 includes a housing 10, an elastic member 20, a strap member 30, and a circuit board 40.

The housing 10 is a frame including a bottom wall 12, two opposite sidewalls 14, and at least an end wall 16. The bottom wall 12 forms a limiting wall 122 and a plurality of restricting blocks 124. The limiting wall 122 is parallel with the end wall 16 at a predetermined distance from the end wall 16. The restricting blocks 124 are symmetrically positioned adjacent to the two sidewalls 14 and parallel with the sidewalls 14 correspondingly. The bottom wall 12, the limiting wall 122, the restricting blocks 124 and the end wall 16 cooperatively define a receiving chamber 120 to receive a chip card. A plurality of first guiding rails 126 and second guiding bars 128 protrudes from the bottom wall 12 in the receiving chamber 120, the guiding bars 126, 128 are parallel to the sidewalls 14. The first guiding bars 126 have an oblique first surface 1262 facing end wall 16. The first guiding bars 126 act as a guide when coupling/inserting a chip card into the receiving chamber 120. The second guiding bars 128 adjacent to the end wall 16 has an oblique second surface 1282 facing limiting wall 122. The second guiding bars 128 act as a guide when taking the chip card out of the receiving chamber 120.

An inner surface of one of the sidewalls 14 has a fixing pole 142 laterally extending and aligning with the limiting wall 122. Accordingly, a space (not labeled) is formed between the fixing pole 142 and the limiting wall 122. The fixing pole 142 is for securing the elastic member 20.

The end wall 16 defines an opening 162 communicating with the receiving chamber 120. A chip card can pass through the opening 162 and into the receiving chamber 120.

The elastic member 20 includes a fastening section 22 and a resisting section 24 connected perpendicular to the fastening section 22. The fastening section 22 is used to attach to the sidewall 14. The fastening section 22 defines a connecting hole 222 to engage with the fixing pole 142 of the sidewall 14. The resisting section 24 is elastically folded relative to the fastening section 22. The resisting section 24 has a protrusion 242 and a hook 244 protruding laterally at the same side surface. The protrusion 242 is at the end of the resisting section 24 and used to resist against a chip card, the hook 244 is at the middle of the resisting section 24 and use to connect with the strip member 30.

The strip member 30 can be a soft rope or a rubber bar, etc. The strip member 30 defines a catching hole 32 at an end. The catching hole 32 catches the hook 244 of the resisting section 24, thus, the strip member 30 is fixed to the elastic member 20.

The circuit board 40 is engageable with the housing 10 and used to cover the receiving chamber 120, the circuit board 40 is electronically connected to the chip card by an electrical connector (not shown).

Figure 2:
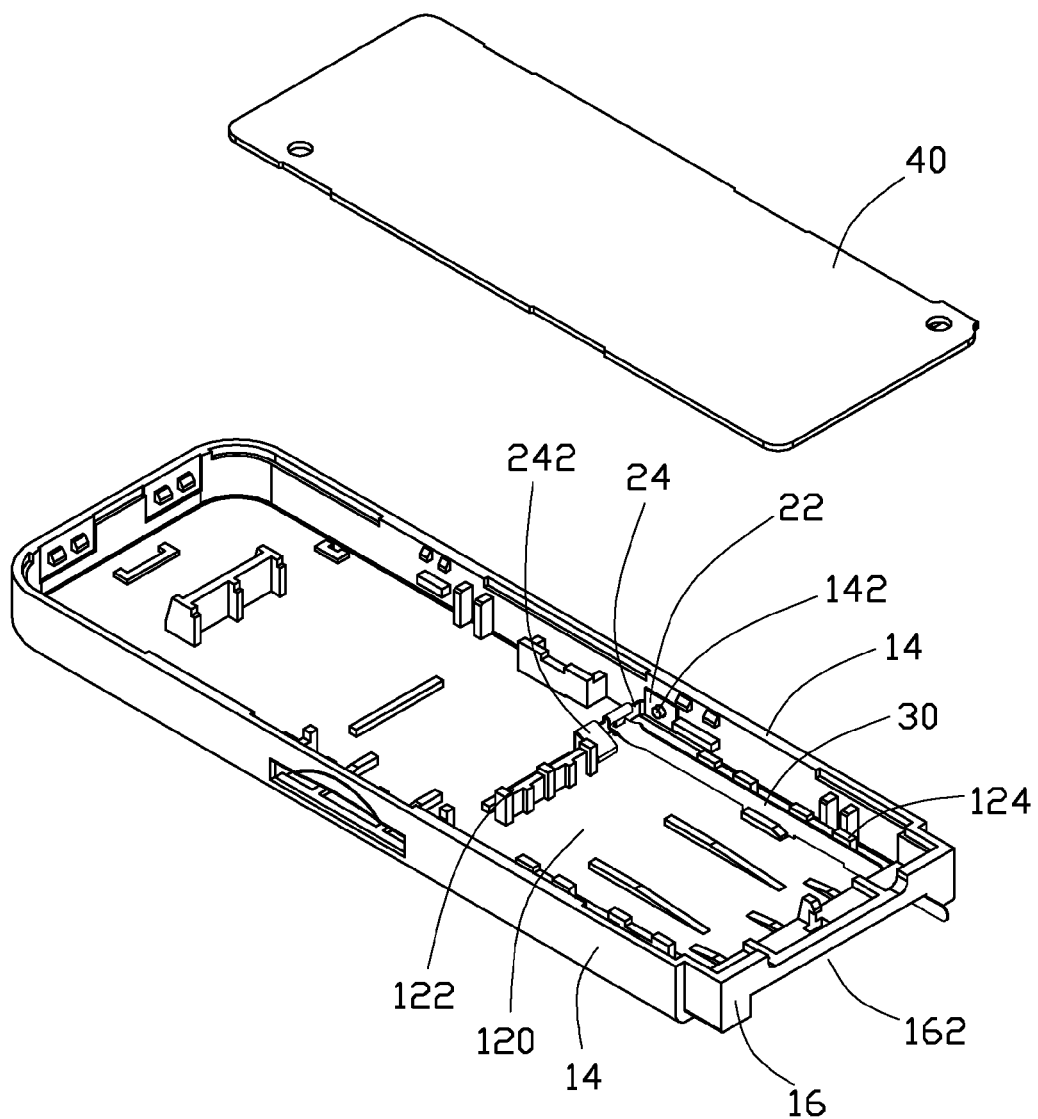
FIG. 2 is schematic view of the chip card assembling structure in assembling shown in FIG. 1.

Referring to FIG. 2, to assemble the chip card assembling structure 100, the elastic member 20 is assembled in the housing 10. The connecting hole 222 of the elastic member 20 is sleeved on the fixing pole 142, thus, the elastic member 20 is secured to the housing 10. The resisting section 24 is arranged perpendicular to the sidewall 14 and in a line with the limiting wall 122, the protrusion 242 and the hook 244 are toward the end wall 16. The strip member 30 is connected with the elastic member 20, the catching hole 32 of the strip member 30 latches with the hook 244 of the elastic member 20. The strip member 30 abuts some restricting blocks 124, with the other end of the strip member 30 extends out of the opening 162. The circuit board 40 is assembled in the housing 10 and covers the cover the receiving chamber 120.

Figure 3:
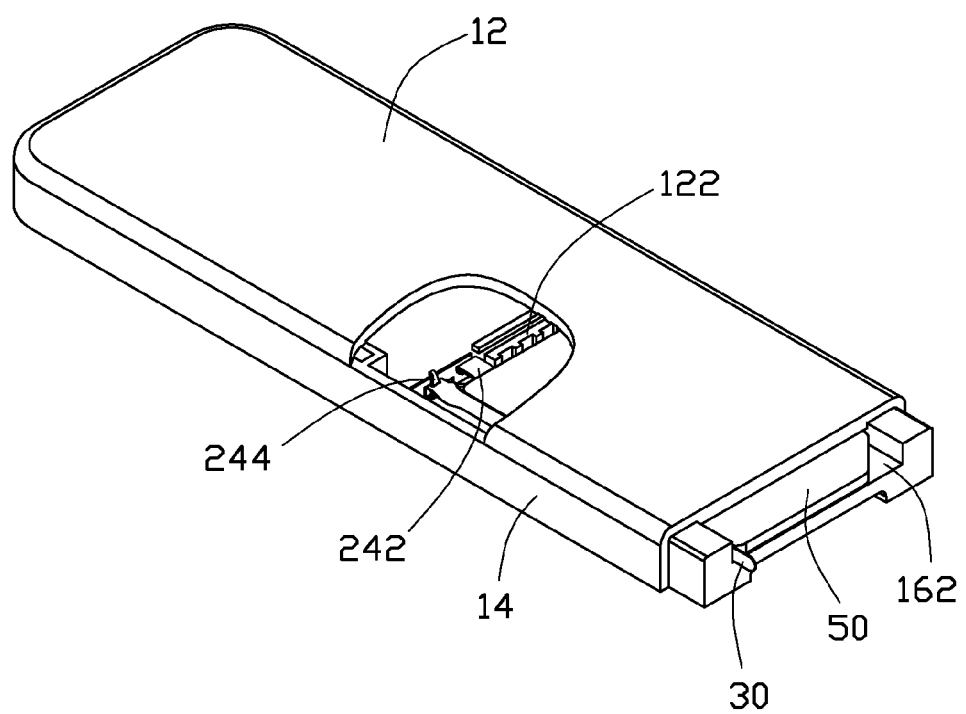
FIG. 3 is cut-way partly view of the chip card assembling structure shown in FIG. 1 assembling a chip card.

Referring to FIG. 3, a chip card 50 is slid into the receiving chamber 120 through the opening 162. The chip card 50 is sandwiched between the circuit board 40 and the guiding bars 126, 128 of the bottom wall 12. At the same time, the chip card 50 electronically connects with the circuit board 40. The protrusion 242 of the elastic member 20 resists an end of the chip card 50, the strip member 30 is at a side of the chip card 50. To remove the chip card 50, the strip member 30 is pulled and the resisting section 24 of the elastic member 20 moves toward the opening 162 of the end wall 16. The protrusion 242 pushes the chip card 50 outwards. Thus, an end of the chip card 50 will protrude from the opening 162 and the chip card 50 can be easily withdrawn. After releasing the strip member 30, the resisting section 24 elastically returns to the original position due to its elasticity. Thereby, the chip card 50 can be assembled/disassembled from the receiving chamber 120 conveniently without a previous detaching of the battery.

It is to be understood that the restricting blocks 124 can be omitted, the bottom wall 12, the limiting wall 122, the sidewalls 14 and the end wall 16 encloses the receiving chamber 120 to receive the chip card 50.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A chip card assembling structure, for securing a chip card in an electronic device, comprising:
   a housing defining a receiving chamber;
   an elastic member secured in the receiving chamber and having an elastic foldable resisting section;
   a strip member having an end connecting with the resisting section and another end exposed from the receiving chamber,
   wherein when a chip card is assembled in the receiving chamber, the resisting section of the elastic member resists against the chip card and the resisting section is folded elastically by pulling the strip member and the chip card can be withdrawn by the pushing of the resisting section.

2. The chip card assembling structure as claimed in claim 1, wherein the housing includes a bottom wall and an end wall, the bottom wall forms a limiting wall spaced from the end wall and a plurality of restricting blocks adjacent to two sides of the bottom wall, the end wall, the limiting wall, and the restricting blocks enclose the receiving chamber.

3. The chip card assembling structure as claimed in claim 1, wherein the bottom wall forms oblique guiding bars in the receiving chamber that facilitate assembly and disassembly of the chip card.

4. The chip card assembling structure as claimed in claim 1, wherein the housing includes a sidewall, the sidewall has a fixing pole protruding laterally toward the limiting wall, the elastic member includes a fastening section defining a connecting hole, the connecting hole receives the fixing pole of the sidewall therein.

5. The chip card assembling structure as claimed in claim 4, wherein the resisting section of elastic member perpendicularly connects with the fastening section and is foldable relative to the fastening section.

6. The chip card assembling structure as claimed in claim 5, wherein the resisting section forms a protrusion at the end to resist against the chip card.

7. The chip card assembling structure as claimed in claim 5, wherein the resisting section forms a hook, the strip member defines a catching hole, the catching hole receives the hook therein.

8. The chip card assembling structure as claimed in claim 5, wherein the chip card assembling structure includes a circuit board to cover the receiving chamber.

9. A chip card assembling structure, for securing a chip card in an electronic device, comprising:
   a housing including a bottom wall, two sidewalls, at least one end wall, the bottom wall, the sidewalls and the end wall enclosing a receiving chamber to receive a chip card, the end wall defining an opening communicating with the receiving chamber;
   an elastic member secured with one of the sidewalls and having a resisting section parallel with the end wall,
   a strip member with a first end connecting with the resisting section and another end extending from the opening;
   wherein a chip card is assembled in the receiving chamber with the resisting section of the elastic member resisting against the chip card, the chip card can be withdrawn by pulling the strip member.

10. The chip card assembling structure as claimed in claim 9, wherein the sidewall has a fixing pole protruding laterally therefrom, the elastic member include a fastening section perpendicular with the resisting section, the fastening section defines a connecting hole, the connecting hole receives the fixing pole of the sidewall therein.

11. The chip card assembling structure as claimed in claim 9, wherein the resisting section forms a protrusion facing the end wall to resist against the chip card.

12. The chip card assembling structure as claimed in claim 9, wherein the resisting section forms a hook, the strip member defines a catching hole at an end, the catching hole receives the hook therein.

13. The chip card assembling structure as claimed in claim 9, wherein the chip card assembling structure includes a circuit board, the circuit engages with the housing and covers the receiving chamber.

* * * * *